(12) United States Patent
Madsen et al.

(10) Patent No.: US 7,654,225 B2
(45) Date of Patent: Feb. 2, 2010

(54) RECYCLING BIRD SEED FEEDER

(75) Inventors: Bent N. Madsen, Westbank (CA); Phil Veenhof, P.O. Box 383 Stn Main, Vernon, British Columbia (CA) V1T 6M3

(73) Assignee: Phil Veenhof, Vernon (CA)

( * ) Notice: Subject to any disclaimer, the term of this patent is extended or adjusted under 35 U.S.C. 154(b) by 261 days.

(21) Appl. No.: 11/984,056

(22) Filed: Nov. 13, 2007

(65) Prior Publication Data

US 2008/0127902 A1    Jun. 5, 2008

Related U.S. Application Data

(60) Provisional application No. 60/858,473, filed on Nov. 13, 2006.

(51) Int. Cl.
*A01K 39/01* (2006.01)
(52) U.S. Cl. .................... 119/52.3; 119/57.9
(58) Field of Classification Search .......... 119/51.01, 119/52.1, 52.2, 52.3, 57.8, 57.9, 428, 429, 119/459, 464; D30/110, 121, 124, 126, 128
See application file for complete search history.

(56) References Cited

U.S. PATENT DOCUMENTS

| | | | | |
|---|---|---|---|---|
| 2,591,459 A | * | 4/1952 | Meany | 119/52.1 |
| 2,715,386 A | * | 8/1955 | Jones | 119/51.5 |
| 3,090,354 A | * | 5/1963 | Merritt et al. | 119/52.4 |
| 3,818,868 A | * | 6/1974 | Boehland, Jr. | 119/431 |
| 3,822,674 A | | 7/1974 | Tobin | |
| 4,131,083 A | | 12/1978 | Sokol et al. | |
| 4,389,975 A | * | 6/1983 | Fisher, Jr. | 119/52.3 |
| 4,765,277 A | * | 8/1988 | Bailey et al. | 119/57.9 |
| 5,289,796 A | | 3/1994 | Armstrong | |
| 5,291,855 A | | 3/1994 | Laverty | |
| 5,558,040 A | * | 9/1996 | Colwell et al. | 119/52.2 |
| 5,829,384 A | | 11/1998 | Landry | |
| 6,253,706 B1 | * | 7/2001 | Sloop | 119/57.9 |
| 6,360,690 B1 | * | 3/2002 | Canby | 119/52.2 |
| 7,017,517 B2 | | 3/2006 | Paquette | |
| 7,409,922 B1 | * | 8/2008 | Baynard et al. | 119/52.3 |
| 2005/0005862 A1 | | 1/2005 | Paquette | |

* cited by examiner

*Primary Examiner*—T. Nguyen
(74) *Attorney, Agent, or Firm*—Antony C. Edwards

(57) ABSTRACT

A bird feeder includes a housing containing a bird food hopper. The hopper feeds food into a tray. The tray is sandwiched between a roof and a floor, both of which extend outwardly from the tray to define a restricted vertical clearance duct for birds attempting access to the tray. Vertical partitions between the roof and floor define a restricted width clearance thereby forming a restricted clearance passageway to the tray between adjacent partitions and the corresponding roof and floor.

18 Claims, 11 Drawing Sheets

RECYCLING BIRD SEED FEEDER

CROSS REFERENCE TO RELATED APPLICATION

This application claims priority from U.S. Provisional Patent Application No. 60/858,473 filed Nov. 13, 2006 entitled RECYCLING BIRD SEED FEEDER.

FIELD OF THE INVENTION

This invention relates to bird feeders, and more particularly to bird feeders that are supported by a thin pole or shaft.

BACKGROUND OF THE INVENTION

In order to provide birds with food during the wintertime when snow often covers the ground, and to lure them closer for better observation, enthusiasts often erect bird feeders in locations where they are readily visible. The easily accessible food attracts various types of birds to the feeder.

However, if preventative steps are not taken, large birds will consume all of the food without letting smaller birds feed. In addition, the food attracts rodents such as squirrels, which climb to the food deck and steal the seed. While they eat, birds often peck erratically and in so doing scatter some seed so that it falls to the ground. Wind can also scatter the seed so that it falls to the ground below and is lost, and rain can soak the seed so that it becomes inedible. If no seed-containing and dispensing means are provided on the unit, the user would be required to replenish the supply several times per day.

Accordingly, several solutions have been developed that attempt to address these problems. Applicant is aware of patents regarding such examples, including:

U.S. Pat. No. 7,017,517 titled "Waste Collection System and Apparatus for Feeders" filed by Nicole Paquette on Jan. 13, 2005, and issued Mar. 28, 2006 teaches a spilled-seed collector having an inverted cone-shaped dish to direct spilled seed towards its center. The center of the dish opens to a hollow, downwardly telescoping support tube that terminates in a base structure containing a seed collection container. A doorway in the base structure allows the seed collection container to be removed and emptied periodically. However, the low position of the seed collection container may make it difficult for elderly people to access, and the dish may also collect bird waste as well as seed, causing the seed to become mixed with fecal material.

U.S. Pat. No. 5,829,384 titled "Bird Feeder" issued to Alfred E. Landry on Nov. 3, 1998, teaches a suspended feeding unit comprising an inverted funnel housed within a seed-storing container mounted on a flat platform. A cone shaped hood is held open at its bottom edge by several flexible tines that bend inward and cause the hood to collapse in the event of a squirrel trying to climb down the hood in order to access the food. The tines and collapsible hood add complexity and cost to the squirrel-repelling device relative to that of the present invention.

U.S. Pat. No. 5,291,855 titled "Bird Feeder" issued to Ralph E. Layerty on Mar. 8, 1994, teaches a pole-mounted bird-feeding unit comprising a flat platform mounted above a tubular squirrel-restraining device. An inverted funnel housed in a tubular seed-housing container covered by a cone-shaped roof rests on the platform and directs the seed outwards onto the platform. However, the wind has open access to blow the seed off of the feeding platform, and as the bird feeder has no feature to collect spilled seed, it will be lost.

U.S. Pat. No. 5,289,796 titled "Bird Feeder" issued to George W. Armstrong on Mar. 1, 1994, teaches an optionally suspended or pole-mounted bird feeder comprising a vertically adjustable seed tray attached to a seed reservoir housing an inverted funnel. The seed tray and reservoir can be moved vertically to allow refilling of the seed by moving the rain cover away from the open-topped seed reservoir. The seed in the tray can still be dampened by drifting rain, and the feeder will likely be dominated by large birds.

U.S. Pat. No. 4,131,083 titled "Bird Unit" issued to John J. Sokol and Florence L. Sokol on Dec. 26, 1978, teaches a pole-mounted bird feeder comprising a seed fill tube partially housed within a guide funnel that directs spilled seed into a catch jar. A platform is mounted near the top of the guide funnel, on which rests a seed reservoir of greater diameter than the fill tube, and containing four circular seed access holes around its bottom edge. A catch jar is suspended below the guide funnel by a screw cap supported by an oblong square brace connected to the lower support pole, while a rain cover containing a channel reservoir for water protects the seed reservoir from the elements. The closed-bottom fill tube contains four holes near its lower portion, and four holes around the top portion to allow seed to drain out into the seed reservoir. However, the seed near the bottom of the fill tube below the lower drain holes can never drain out of the fill tube, and may eventually become damp and musty, tainting the fresh seed above it. The solid guide funnel will collect bird waste as well as seed, causing some of the spilled seed to become mixed with the fecal material. The bird feeder also lacks a device to restrain agile squirrels from climbing up the pole and stealing the food.

U.S. Pat. No. 3,822,674 titled "Bird Feeder" issued to Robert A. Tobin on Jul. 9, 1974, teaches a suspended spherical container having a pipe and feeder table attached to its lower portion. The pipe contains a plurality of small holes drilled at various heights above the feeder table to allow small birds to access small seeds, as well as semi-circular holes around its bottom edge to allow seed to flow onto the feeder table. An inverted funnel within the pipe directs the seed towards the pipe walls. Although the sphere contains a drip ring on its lower portion, the seed in the feeder table can still become wet from blowing rain or snow, and larger birds can still access the seed and spill some on the ground while they peck.

SUMMARY OF THE INVENTION

The present invention relates to a pole-mounted bird feeder that provides food to small birds while restricting larger birds that would otherwise drive the small birds away. A pointed metal stake having a horizontal crosspiece for driving it into the ground anchors a five-piece support shaft to the ground. A cylindrical squirrel-restraining device is mounted on the second shaft segment directly below a spilled-seed collecting container having a rotatable door at its lower end to permit access to the spilled seed. A guide funnel is mounted above the seed-collecting container. It is supported by the third shaft segment and has a fine-mesh angled portion to allow rain water and bird waste to pass through while directing spilled seed into the collecting container. The fourth shaft segment supports a feeding platform. A seed reservoir having a plurality of seed access ports in its sidewalls is mounted thereon. An inverted funnel inside the seed reservoir directs seed toward the reservoir walls and out of the seed access ports. A low containing wall prevents seed from falling from the feeding platform, and a plurality of divider tabs spaced around the circumference of the feeding platform provide sheltered eating areas for the birds. Together with the divider tabs, a large washer-shaped disc which serves as a height restrictor rests on top of the divider tabs to inhibit large birds from gaining access to the food. A dome-shaped rain cover shelters the seed from the elements. A threaded fastening knob atop the dome holds the assembly together by tightening down onto the threaded end of the fifth shaft segment.

In summary, the bird feeder of the present invention may be characterized as including, in one aspect, an upper housing containing a hopper, the upper housing having a plurality of outlet apertures around a base of the upper housing. A tray mounted or otherwise formed (collectively herein referred to as being mounted) underneath the base of the upper housing and sized to cooperate with the outlet apertures to collect bird food flowing from the hopper and into the tray from the outlet apertures. A roof extends cantilevered outwardly from the upper housing and at least is extensive with the tray around the perimeter of the base of the upper housing, the roof positioned adjacent and over the outlet apertures. The roof interferes with the flapping of the wings of larger birds to inhibit their access to the tray. A lower housing member is mounted underneath and adjacent the tray. The lower housing member extends cantilevered outwardly from under the tray. The lower housing member is substantially parallel to the roof and thereby defines a feeding access duct having a vertical clearance height therebetween. A plurality of substantially vertical partitions extend between the lower housing member and the roof so as to define feeding access passageways within said feeding access duct, and wherein said feeding access passageways have no more than a first width.

The vertical clearance and the first width are sized so that the feeding access passageways allow access therethrough only by desired species of birds so that the desired species of birds have access to the bird food in the tray. The desired species of birds are differentiated from undesired species of birds based on the size of the birds. The feeding access passageways are sized to exclude the undesired species.

The partitions may extend outwardly from said tray. The partitions may be a radially spaced apart array of the partitions spaced apart around the base of the upper housing, and wherein the partitions extend substantially radially outwardly of the base relative to a center of the upper housing. The partitions may be substantially co-terminous with said lower housing member in a radially outwardly direction relative to the center. The lower housing member and the roof may be substantially plate-shaped.

An upper portion of the upper housing may be a substantially water-proof enclosure and the roof may be formed as an annular disc mounted under and around said enclosure. The enclosure may be substantially domed shaped and the hopper may be a cylinder mounted within said dome. The tray may be defined by an annular upstanding rim formed on the lower housing member. The base of said upper housing may be the base of said hopper. The rim may be radially set back relative to outer perimeters of the lower housing member or the roof so as to be adjacent the base of the hopper.

The feeder may include a linear shaft having first and second opposite ends, and wherein the upper housing and the lower housing member are mounted on the first end of the shaft and wherein the second end of said shaft is adapted to be mounted to a floor or ground surface. A catch basin may be mounted on the shaft so as to be operably disposed beneath the lower housing member, the catch basin extending outwardly of the shaft so as to extend radially outwardly beyond an outer perimeter of the lower housing member to thereby catch detritus falling from the lower housing member. A recycling container may be mounted to cooperate with the catch basin for collecting the detritus falling into the catch basin from the lower housing member. The catch basin may be an inverted cone and the container mounted beneath and so as to form part of a vertex of the cone. The cone may be frusto-conical. A mesh screen may be mounted over the opening into the inverted cone, the mesh sized to allow seed to fall into the cone. The conical sides of the cone may be of a smaller mesh to allow water to pass through the sides but to urge the seeds into the container.

Means may be mounted to the shaft and under the catch basin for preventing small climbing animals climbing up the shaft so as to gain access to the catch basin or the feeding access ducts. The means mounted to the shaft may include a hollow cylindrical member disposed with an open end thereof opening downwardly along said shaft.

In one embodiment the shaft defines an axis of symmetry of the lower housing member, the upper housing, and the catch basin.

BRIEF DESCRIPTION OF THE DRAWINGS

With reference to the drawings, wherein similar characters of reference denote corresponding parts in each view.

DETAILED DESCRIPTION OF EMBODIMENTS OF THE INVENTION

Figure 1:
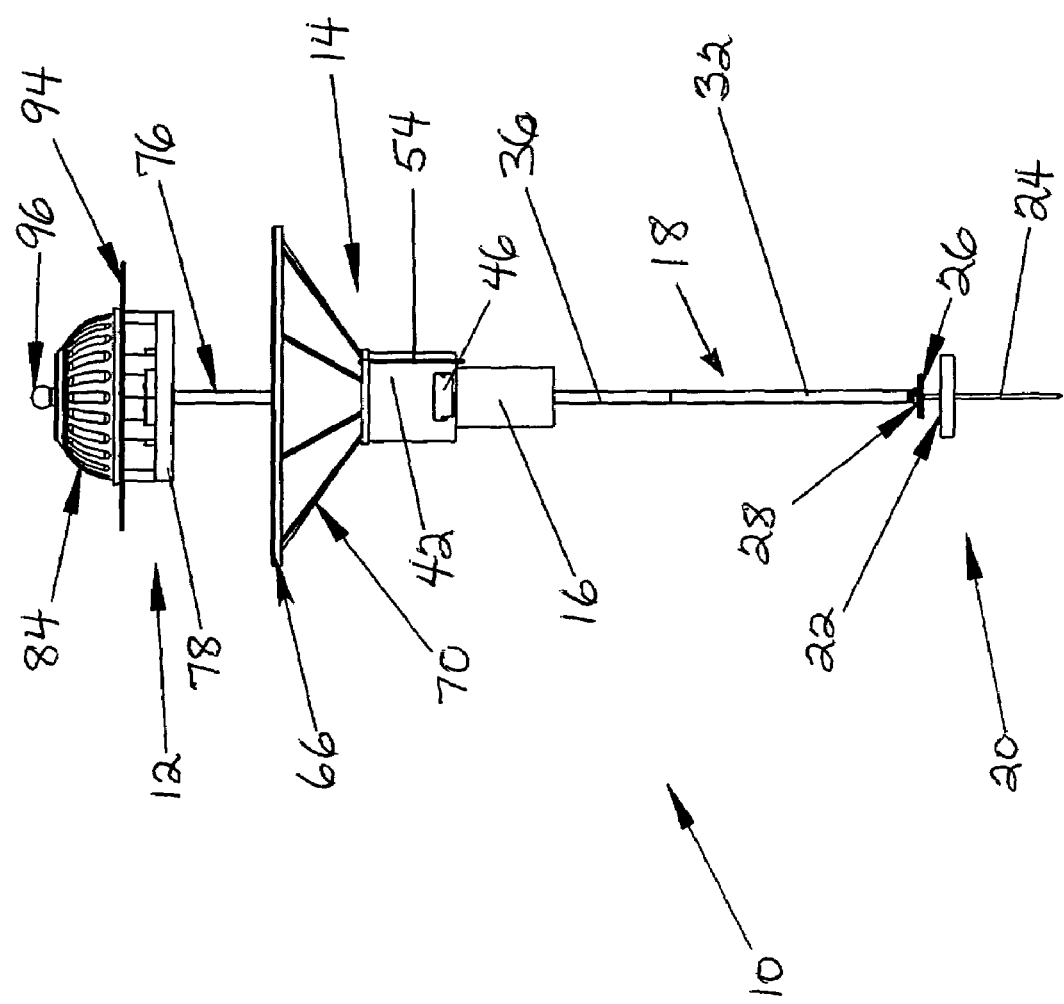
FIG. 1 is, in front view, the bird feeder of the present invention.
Figure 2:
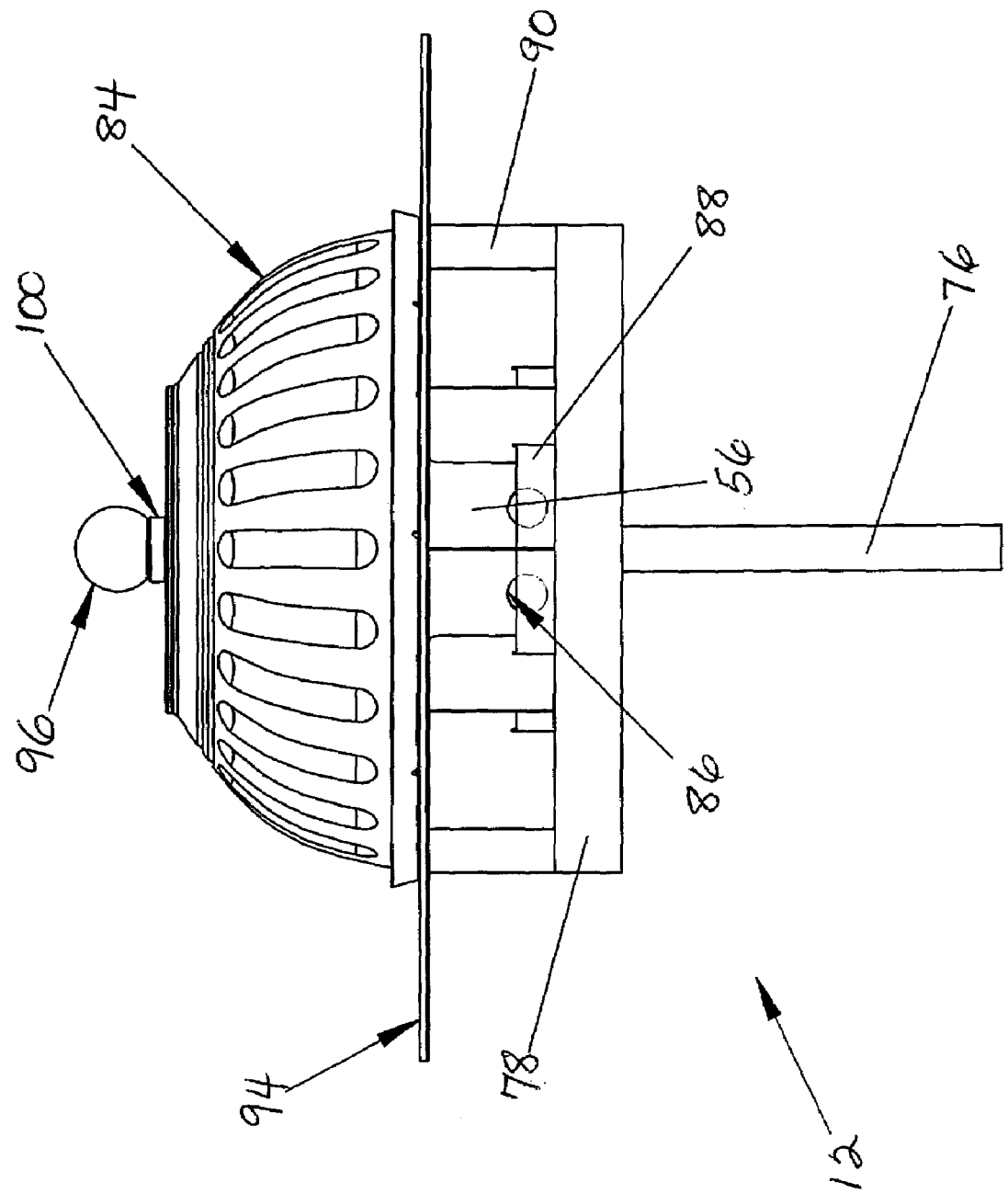
FIG. 2 is, in front view, the upper feeding portion of the bird feeder of the present invention.

The bird feeder according to the present invention indicated generally in FIG. 1 by reference numeral 10 includes a feeding assembly 12 mounted above a spilled-seed collection assembly 14 and squirrel restraint 16. It is supported by a five-piece shaft 18 better described below which ultimately terminates in an anchoring assembly 20.

Figure 8:
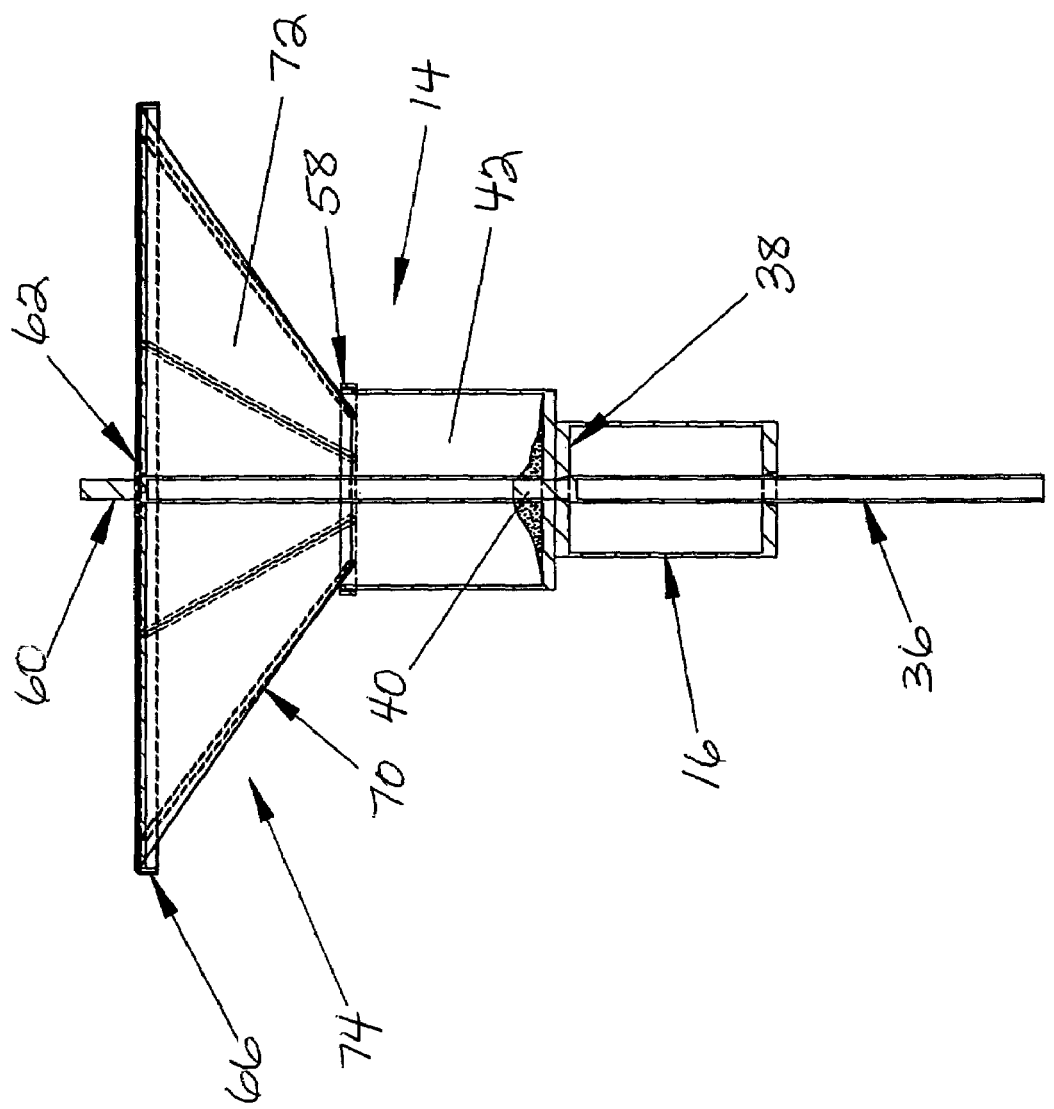
FIG. 8 is, in cutaway front view, the waste seed collection assembly and squirrel deterrent unit showing some spilled seed in the collection container.
Figure 9:
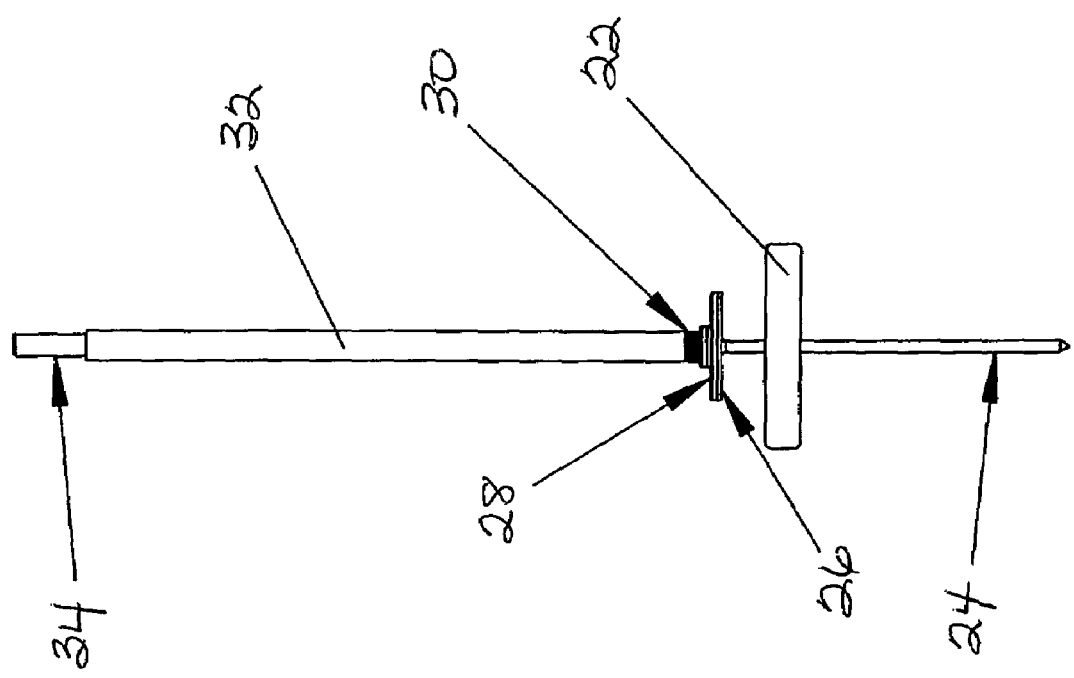
FIG. 9 is, in front view, the lower anchoring assembly of the bird feeder of the present invention.

The anchoring assembly 20 contains a horizontal crosspiece 22 attached near the upper portion of a ground-piercing stake 24. The horizontal crosspiece 22 provides a rigid means for the user to drive the stake 24 into the ground using for example, the user's foot. The upper portion of stake 24 terminates in a square horizontal plate 26 on which is mounted circular base 28. An externally threaded lower end 30 of the bottom shaft segment 32 fastens to the internally threaded boss mounted on the shaft support base 28 as shown in FIG. 9. A cylindrical tab 34 of diameter slightly less than the inside diameter of a hollow shaft segment 36 protrudes from the upper end of the bottom shaft segment 32 for insertion into the shaft segment 36. Thus the shaft segment 36 slidably mounts onto the protruding tab 34 of the bottom shaft segment 32. The opposite, upper end of shaft segment 36 passes through a hole in the center of the bottom surface of the cylindrical squirrel restraint 16. The bottom surface 38 of the upper section of the squirrel restraint 16 rests on the top surface of the upper end of shaft segment 36 so that the shaft tab 40 partially protrudes through the top section of the squirrel restraint 16 as shown in FIG. 8. The bottom surface of the cylindrical spilled seed collector 42 rests on the top surface of the squirrel restraint 16. The protruding shaft tab 40 fits snugly inside a hole in the center of the bottom surface of the cylindrical spilled seed collector 42. The squirrel restraint 16 prevents squirrels and other rodents from climbing up the support shaft 18 and inhibits them from reaching the food 44 in the bird feeder.

Figure 6:
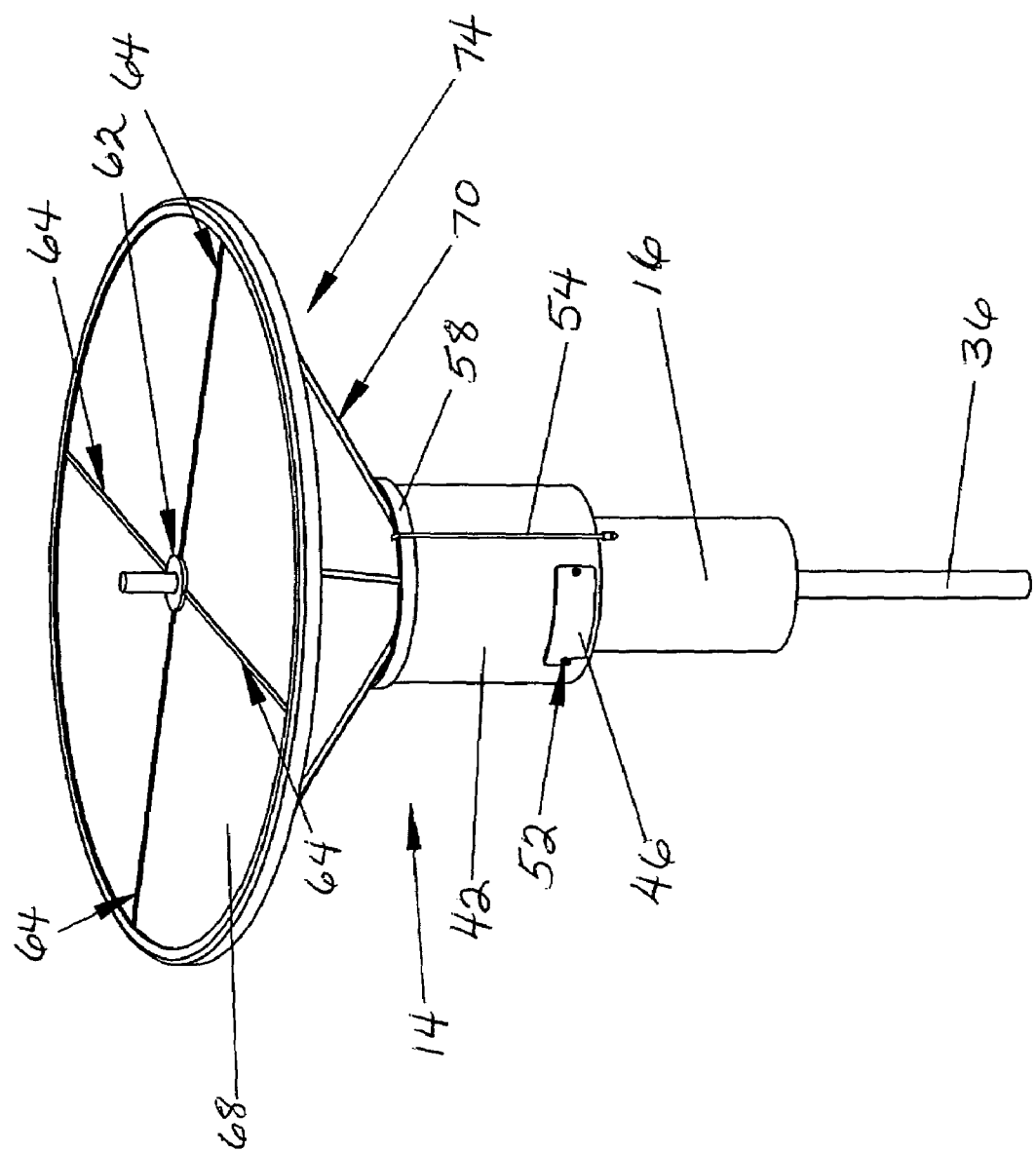
FIG. 6 is, in front perspective view, the waste seed collection assembly and squirrel deterrent unit of the bird feeder of the present invention.
Figure 7:
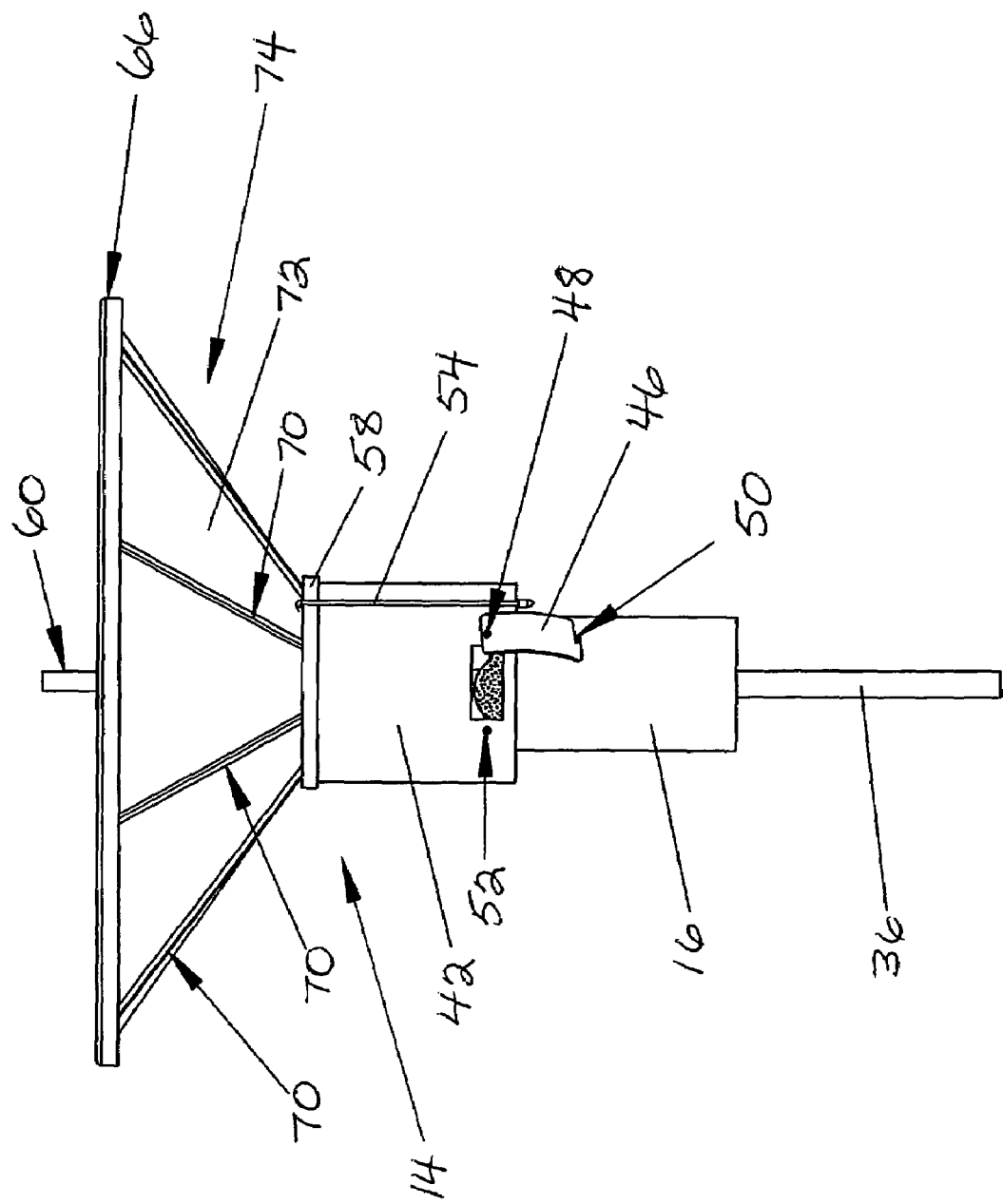
FIG. 7 is, in front view, the waste seed collection unit with its spilled seed access door open and the squirrel deterrent unit of the bird feeder of the present invention.

As seen in FIGS. 6 and 7, a spilled seed access door 46 is pivotally fastened at one end to the outside wall of the spilled seed collector 42 by a pivot screw 48. The other end of the spilled seed access door 46 has been formed into a hook-shaped latch 50 that usually rests on latch pin 52, but can be swung open to expose a square hole opening into the spilled seed collector 42. When the access door 46 is open, the spilled seed can be pulled out of the spilled seed collector 42 using a seed hook 54 and replaced in the seed reservoir 56. When it is not in use, seed hook 54 can be hung from the lower screen support 58.

The screen shaft segment 60 slidably engages the protruding shaft tab 40, and its bottom surface rests against the floor of the spilled seed collector 42 as shown in FIG. 8. The top surface of the screen shaft segment 60 supports the underside of the screen support washer 62. Four horizontal screen support bars 64 connect the screen support washer 62 to the outside circular support 66, and also support a layer of coarse screen mesh 68. Eight angled screen support bars 70 connect the outside circular support 66 to the lower screen support 58 and also support a layer of fine screen mesh 72. The lower screen support 58 centers the seed guide funnel 74 so that any falling seed will be directed into the spilled seed collector 42.

The coarse screen mesh 68 on the top surface of the seed guide funnel 74 allows seeds and shells to pass through it while preventing birds and rodents from accessing and spoiling the seed in the spilled seed collector 42. The fine screen mesh 72 on the angled surface of the seed guide funnel 74 allows rain water and bird excrement to pass through it while directing seed and shells into the spilled seed collector 42 for reuse. The mesh seed guide funnel 74 also allows skittish birds to see the ground below them. Because of the distance from the feeding assembly 12 to the seed guide funnel 74, much of the lighter seed chaff is carried away by the wind instead of falling into the spilled seed collector 42.

Figure 3:
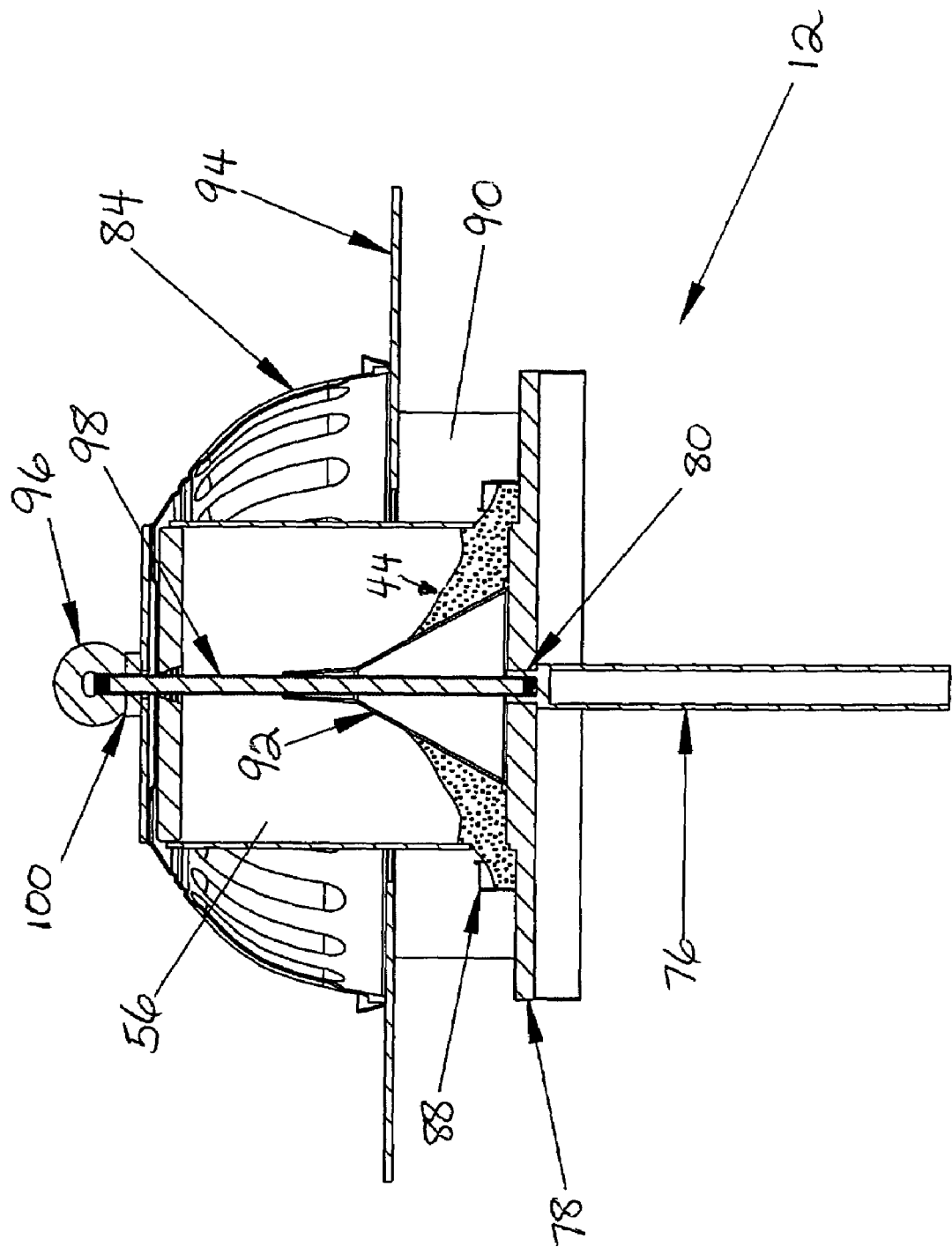
FIG. 3, in front cutaway view, shows the internal components of the upper feeding portion of the bird feeder of the present invention.
Figure 4:
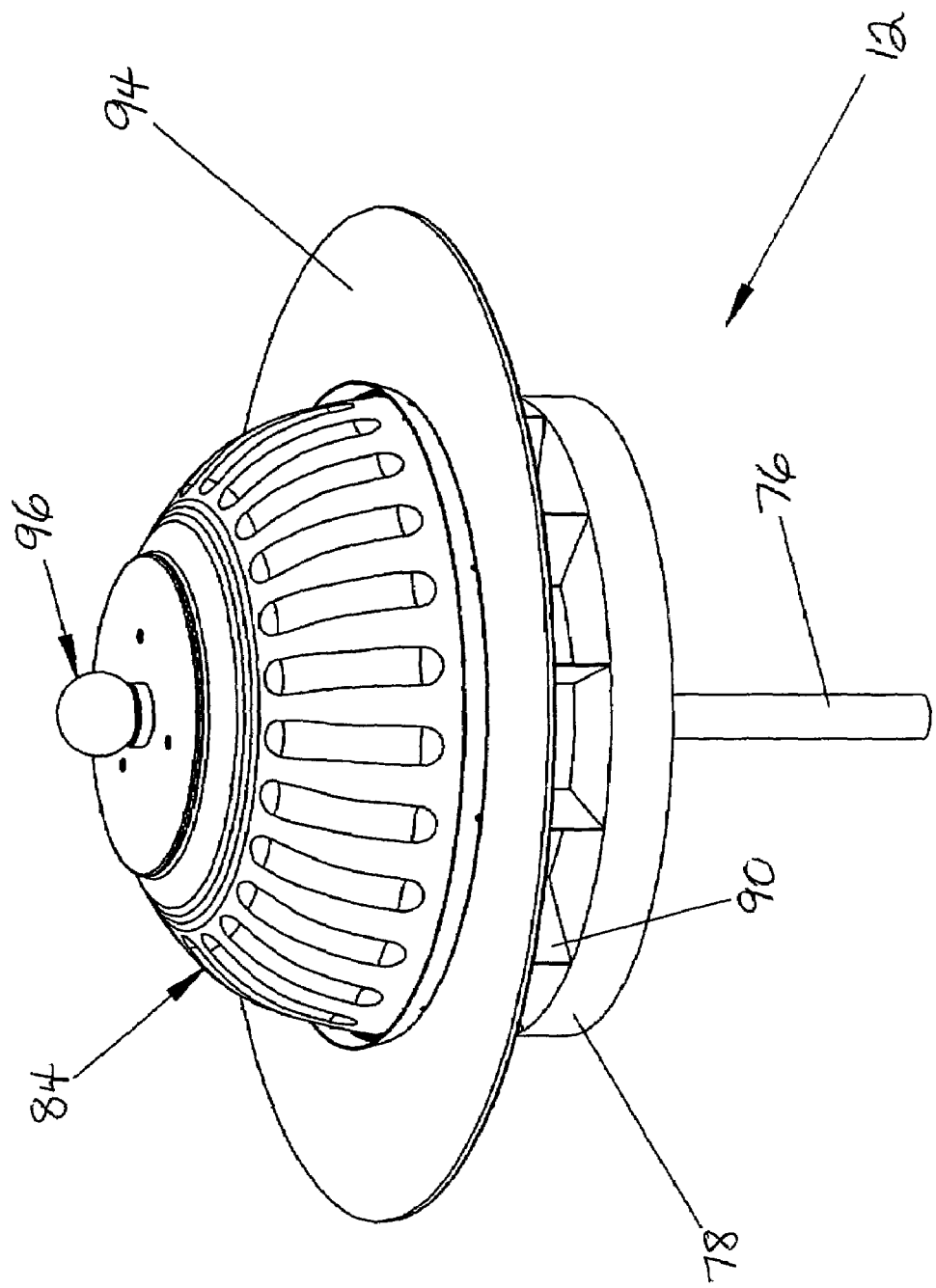
FIG. 4 is, in front perspective view, the upper feeding portion of the bird feeder of the present invention.
Figure 5:
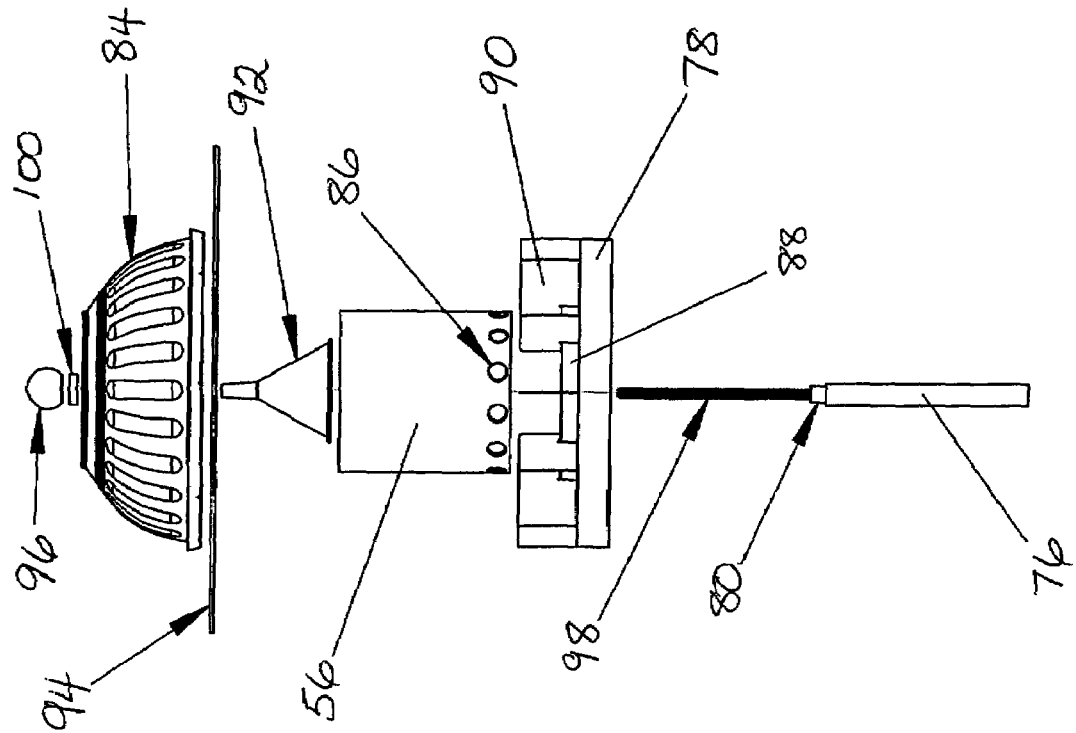
FIG. 5 is, in front exploded view, the upper feeding portion of the bird feeder of the present invention.

Slidably engaging the protruding tab of the screen shaft segment 60, the top shaft segment 76 rests on top of the screen support washer 62. The feeding platform 78 is supported by the top edge of the top shaft segment 76 while an internally threaded cylindrical tab 80 protrudes through a hole in the floor of the feeding platform 78 as seen in FIG. 3. A threaded rod 82 screws into this internally threaded tab 80 and passes through the center of the feeding assembly 12 and out through the rain cover 84. The internally threaded tab 80 protruding from the top shaft segment 76 passes through the floor of the seed reservoir 56 and holds it in position. As seen in FIG. 5, twelve circular seed access ports 86 are spaced evenly around the lower portion of the seed reservoir 56 to allow seed to flow onto the feeding platform 78. A low containing wall 88 offset from the seed reservoir 56 prevents the seed from flowing over the edge of the feeding platform 78 and also provides a perch for small birds. Twelve divider tabs or partitions 90 are spaced evenly around the outside of the feeding platform 78 to restrict the size of the birds that can access the food and provide the birds with an eating area sheltered from the wind.

Concentrically housed within the seed reservoir 56, the inverted funnel 92 rests on the floor of the seed reservoir 56 and directs the seed outwards toward the seed access ports 86. A large washer-shaped height restrictor 94 rests on the top surfaces of the divider partitions 90 and prevents large birds from accessing the food. Mounted on top of height restrictor 94 is a dome-shaped rain cover 84, attached with several screws. A stiffening member below the top surface of the rain cover 84 also centers it around the seed reservoir 56. A spherical, internally threaded fastening knob 96 fastens onto the protruding threaded rod 98 and presses a circular rubber seal 100 tightly against the top surface of the rain cover 84 to seal it from leaking and to hold the feeding assembly 12 together.

Figure 11:
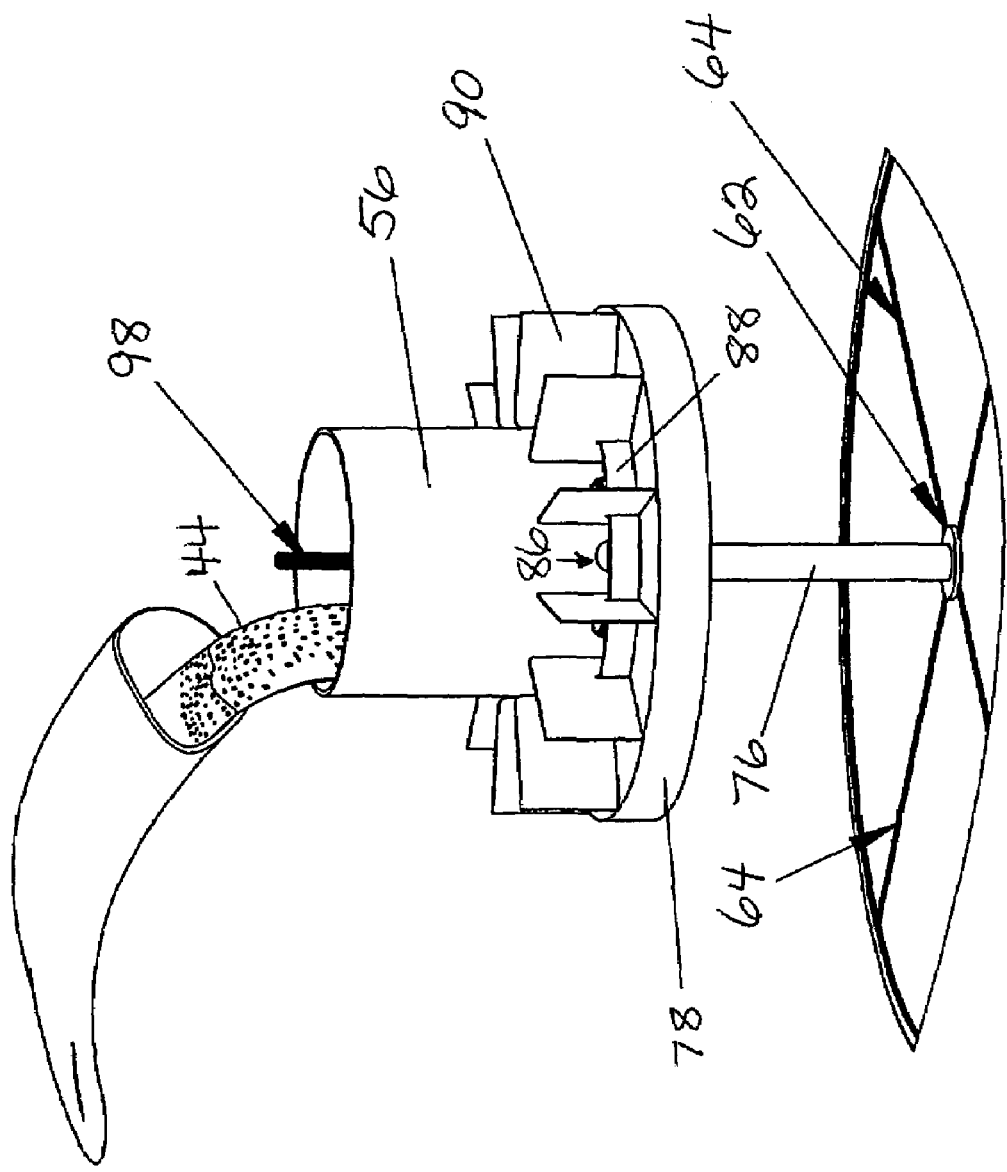
FIG. 11 is, in cropped isometric view, the upper feeding portion of the bird feeder of the present invention with its weather-protection components removed to allow refilling of the seed-storage unit.

In order to refill the seed reservoir 56 with birdseed 44, the fastening knob 96 must be loosened off from the threaded rod 98 and the height restrictor 94 and rain cover 84 lifted off as shown in FIG. 11. Then it is a simple matter to pour more birdseed into the seed reservoir 56 and replace the height restrictor 94, the rain cover 84, the rubber seal 100 and the fastening knob 96.

Figure 10:
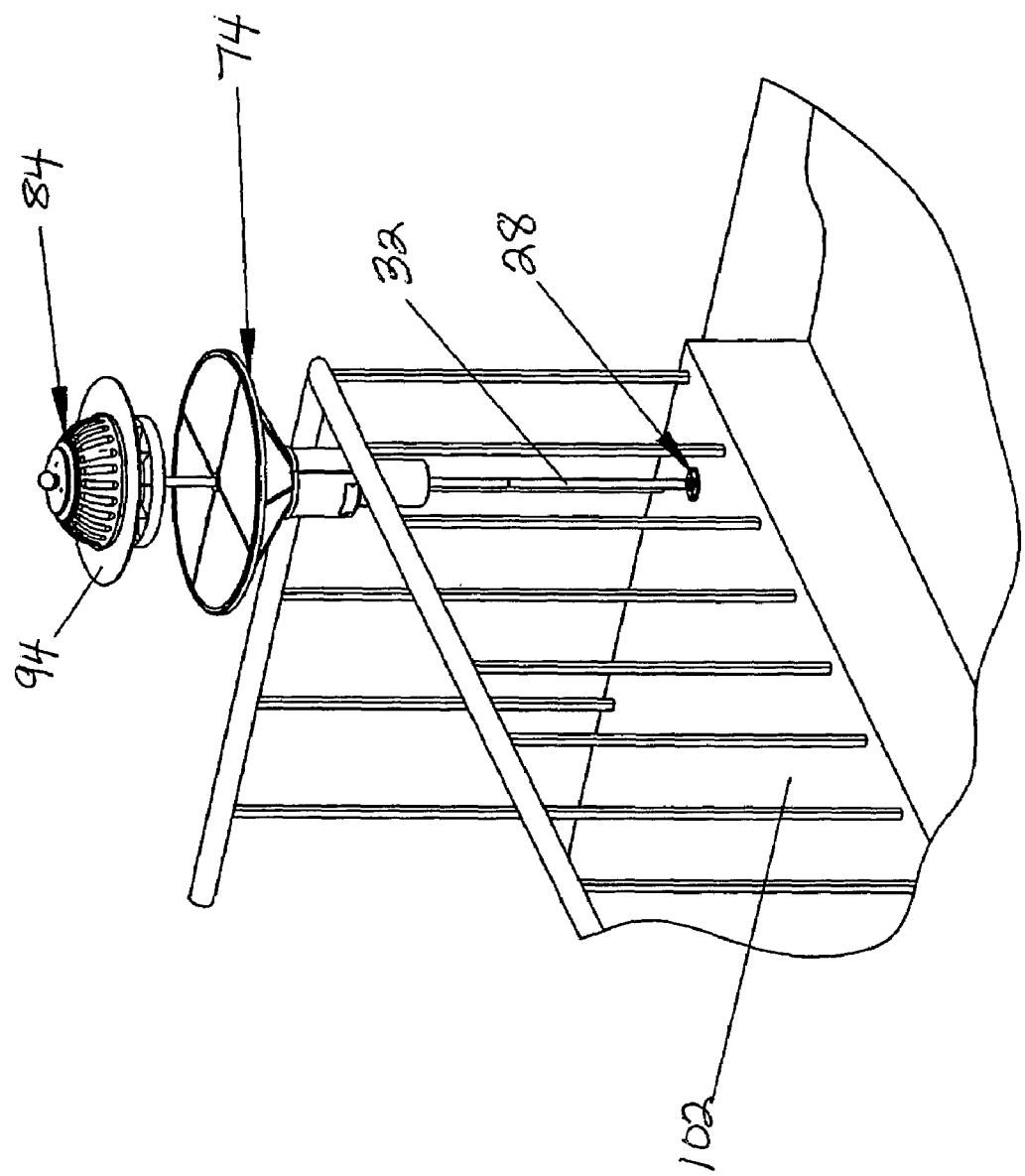
FIG. 10 is, in isometric view, the bird feeder of the present invention with the stake portion removed and the shaft support base bolted directly to a deck.

As shown in FIG. 10, the circular shaft support base 28 can easily be unscrewed from the horizontal plate 26 attached to the stake 24 and mounted directly onto a deck 102 to lure the birds closer. Similarly, it can also be bolted to a cut-off stump or any other similar rigid, horizontal surface. This gives the user a broad range of options for locating the bird feeder 10 of the present invention.

In an alternative embodiment, the fastening knob that secures the feeding assembly together can be replaced with a threaded lifting hook or lifting eye. This allows the feeding assembly to be suspended from a tree limb, roof overhang, or other sturdy support means.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:
1. A bird feeder comprising:
an upper housing containing a hopper, said upper housing having a plurality of outlet apertures around a base of said upper housing;
a containing wall offset from said outlet apertures in said base of said upper housing and sized to cooperate with said outlet apertures to collect bird food flowing from said hopper and against said containing wall from said outlet apertures;
a roof extending cantilevered outwardly from said upper housing and at least is extensive with said containing wall around the perimeter of said base of said upper housing, said roof positioned adjacent and over said outlet apertures;
a feeding platform mounted underneath and adjacent said containing wall, said feeding platform extending canti- levered outwardly from under said containing wall, said feeding platform substantially parallel to said roof;

a plurality of substantially vertical partitions extending between said feeding platform and said roof so as to define feeding access passageways, wherein said partitions are a radially spaced apart array of said partitions spaced apart around said base of said upper housing, and wherein said partitions extend substantially radially outwardly of said base relative to a center of said upper housing, wherein said partitions are substantially vertical and are mounted onto said containing wall, and wherein said partitions extending substantially to the edge of said feeding platform.

2. The feeder of claim 1 wherein said partitions extend outwardly from said tray.

3. The feeder of claim 2 wherein said feeding platform is substantially plate-shaped.

4. The feeder of claim 3 wherein said roof is substantially plate-shaped.

5. The feeder of claim 4 wherein an upper portion of said upper housing is substantially water-proof enclosure and wherein said roof is formed as an annular disc mounted under and around said enclosure.

6. The feeder of claim 5 wherein said enclosure is substantially domed shaped and wherein said hopper is a cylinder mounted within said dome, and wherein said containing wall is an upstanding rim, and wherein said base of said upper housing is the base of said hopper.

7. The feeder of claim 6 wherein said rim is radially set back relative to outer perimeters of said feeding platform or said roof so as to be adjacent said base of said hopper.

8. The feeder of claim 1 further comprising a linear shaft having first and second opposite ends, and wherein said upper housing and said feeding platform are mounted on said first end of said shaft and wherein said second end of said shaft is adapted to be mounted to a floor or ground surface, and further comprising a catch basin mounted on said shaft so as to be operably disposed beneath said feeding platform, said catch basin extending outwardly of said shaft so as to extend radially outwardly beyond an outer perimeter of said feeding platform to thereby catch detritus falling from said feeding platform.

9. The feeder of claim 8 further comprising a recycling container cooperating with said catch basin for collecting the detritus falling into said catch basin from said feeding platform.

10. The feeder of claim 9 wherein said catch basin is an inverted cone and said container is mounted beneath and so as to form part of a vertex of said cone.

11. The feeder of claim 10 wherein said cone is frusto-conical.

12. The feeder of claim 8 further comprising means mounted to said shaft and under said catch basin for preventing small climbing animals climbing up said shaft so as to gain access to said catch basin or said feeding access passageways.

13. The feeder of claim 12 wherein said means mounted to said shaft includes a hollow cylindrical member disposed with an open end thereof opening downwardly along said shaft.

14. The feeder of claim 8 wherein said shaft defines an axis of symmetry of said feeding platform and said upper housing.

15. The feeder of claim 14 wherein said shaft defines an axis of symmetry for said catch basin.

16. The feeder of claim 9 wherein said recycling container includes an access door for retrieving the detritus so as to recycle unused seed therein.

17. The feeder of claim 1 wherein said upper housing includes an access door for filling said hopper.

18. The feeder of claim 6 wherein said hopper has an open top and said upper housing includes an access door cooperating with said open top.

* * * * *